(12) United States Patent
Mangal

(10) Patent No.: US 7,768,967 B1
(45) Date of Patent: *Aug. 3, 2010

(54) TRAFFIC DISTRIBUTION IN A WIRELESS COMMUNICATION SYSTEM

(75) Inventor: Manish Mangal, Lawrence, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 47 days.

This patent is subject to a terminal disclaimer.

(21) Appl. No.: 10/922,178

(22) Filed: Aug. 19, 2004

Related U.S. Application Data

(63) Continuation of application No. 09/546,677, filed on Apr. 11, 2000, now Pat. No. 6,801,519.

(51) Int. Cl.
*H04W 4/00* (2009.01)

(52) U.S. Cl. .................. 370/329; 370/280; 370/281; 370/314; 370/332; 370/337; 370/349; 375/219; 375/220; 375/221; 375/295; 375/316; 375/346; 455/414; 455/426.1; 455/517

(58) Field of Classification Search .......... 370/280, 370/281, 314, 329, 332, 337, 349; 375/219, 375/220, 221, 295, 316, 346; 455/414, 426.1, 455/517

See application file for complete search history.

(56) References Cited

U.S. PATENT DOCUMENTS

| | | | |
|---|---|---|---|
| 5,428,819 A | 6/1995 | Wang et al. | |
| 5,475,677 A * | 12/1995 | Arnold et al. | 370/280 |
| 5,638,371 A | 6/1997 | Raychaudhuri et al. | |
| 5,684,791 A | 11/1997 | Raychaudhuri et al. | |
| 5,887,020 A * | 3/1999 | Smith et al. | 375/130 |
| 6,108,533 A * | 8/2000 | Brohoff | 455/414.3 |
| 6,223,055 B1 * | 4/2001 | Cyr | 455/555 |
| 6,226,525 B1 | 5/2001 | Boch et al. | |
| 6,272,353 B1 * | 8/2001 | Dicker et al. | 455/517 |
| 6,374,112 B1 | 4/2002 | Widegren et al. | |
| 6,389,284 B1 * | 5/2002 | Cook et al. | 455/434 |
| 6,407,993 B1 | 6/2002 | Moulsley | |
| 6,415,158 B1 * | 7/2002 | King et al. | 455/552.1 |
| 6,449,265 B1 | 9/2002 | Prieto, Jr. | |
| 6,512,773 B1 | 1/2003 | Scott | |
| 6,651,207 B1 * | 11/2003 | Dicker et al. | 714/746 |
| 6,778,517 B1 * | 8/2004 | Lou et al. | 370/338 |
| 6,961,584 B2 * | 11/2005 | Leedom, Jr. | 455/552.1 |
| 7,065,353 B1 * | 6/2006 | Bolinth et al. | 455/426.1 |
| 7,092,372 B1 * | 8/2006 | Jensen et al. | 370/337 |

\* cited by examiner

*Primary Examiner*—William Trost, IV
*Assistant Examiner*—Toan D Nguyen

(57) ABSTRACT

A wireless communication system using a media access control (MAC) layer comprising a subscriber unit system and a base station system. The base station system is configured to receive a request for a communication service, dynamically select between a first portion of the MAC layer corresponding to a first wireless transmission link using a licensed radio frequency and a second portion of the MAC layer corresponding to a second wireless transmission link using an unlicensed radio frequency, and exchange communications for the communication service over the selected one of the first portion and the second portion of the MAC layer. The subscriber unit system is configured to transmit the request for the communication service to the base station system and exchange the communications for the communication service over the selected one of the first portion and the second portion of the MAC layer.

30 Claims, 5 Drawing Sheets

TRAFFIC DISTRIBUTION IN A WIRELESS COMMUNICATION SYSTEM

RELATED APPLICATIONS

This application is a continuation of application Ser. No. 09/546,677, now U.S. Pat. No. 6,801,519, filed Apr. 11, 2000.

FEDERALLY SPONSORED RESEARCH OR DEVELOPMENT

Not applicable

MICROFICHE APPENDIX

Not applicable

BACKGROUND OF THE INVENTION

1. Field of the Invention

The invention relates to communication networks, and specifically, to a method and system for dynamically controlling traffic distribution over a pair of wireless transmission links.

2. Description of the Prior Art

The development of advanced wireless communication networks have taken on critical importance with the dramatic rise in consumer demand for services. With the proliferation of the Internet, new types of communication services have been added to the array of services offered to consumers. Internet applications such as web browsing, chat rooms, and PUSH technology have joined e-mail, bulletin boards, and voice communication as conventional communication services.

Different wireless communication services require different qualities of service and have different priorities. Certain applications such as video and audio are time dependent, while e-mail and text are not. Telephone conversations and web browsing require delivery in real time, while video mail can be observed at a later point. In addition, telephone conversations can have some errors or static and still be understood by the listener but are time dependent. On the other hand, downloading a computer program must be error free but is not time dependent.

To control the quality of service for wireless communications such as voice, video and data, service providers operate wireless systems in licensed frequencies. These frequencies are typically licensed from the Federal Communications Commission (FCC) to the service provider on a geographic basis. Once licensed, the service provider exercises management control over the frequencies in the specified coverage area ensuring the necessary quality of service. Some examples of licensed frequencies include Personal Communication Service (PCS), Microwave Multipoint Distribution System (MMDS), and Local Multipoint Communication Systems.

On the other hand, the FCC also allocates blocks of unlicensed frequencies that may be used by any service provider or end user. Unlicensed frequencies however, while freely available, do not allow service providers to manage the quality of service provided for sensitive communication. Some examples of unlicensed frequencies include Unlicensed Personal Communication Service (UPCS) and Industrial Scientific Medical (ISM) bands.

Unfortunately, the licensed frequencies are a scarce and expensive resource. Therefore, it is a problem in wireless communication networks to continually support the addition of services over the licensed transmission frequencies.

SUMMARY OF THE INVENTION

The present invention advances the art by providing a method and system for dynamically controlling wireless communication service traffic over a licensed wireless transmission link and unlicensed wireless transmission link based on a quality of service. Some examples of communication service traffic includes but is not limited to, telephony, multimedia, internet applications, digital audio, and video entertainment. The invention supports the varying quality of service requirements by dynamically exchanging communication service traffic over the licensed wireless transmission link where the required quality of service is high and exchanging communication service traffic over the unlicensed wireless transmission link where the required quality of service is low.

The invention is comprised of a wireless system using a media access control (MAC) layer comprising a first portion corresponding to a first wireless transmission link using a licensed frequency and a second portion corresponding to a second wireless transmission link using an unlicensed frequency. The wireless system provides the communication service to the consumer by: 1) receiving a request for a communication service, 2) in response to receiving the request, dynamically selecting between the first portion and second portion of the MAC layer based on the required quality of service, and 3) providing the requested communication service over the selected one of the first portion and the second portion of the MAC layer.

Advantageously the present invention improves network efficiencies and increases throughput by providing various wireless communication services over both licensed and unlicensed frequencies. Also advantageously the present invention permits the use of wireless communications to provide a diverse array of communications services and allows new communication services to be provided to end user without the burdens of wiring the residence or business for the new services. Also, existing communication services are freed from constraints of the existing wired solution.

DETAILED DESCRIPTION OF THE PREFERRED EMBODIMENT

Figure 1:
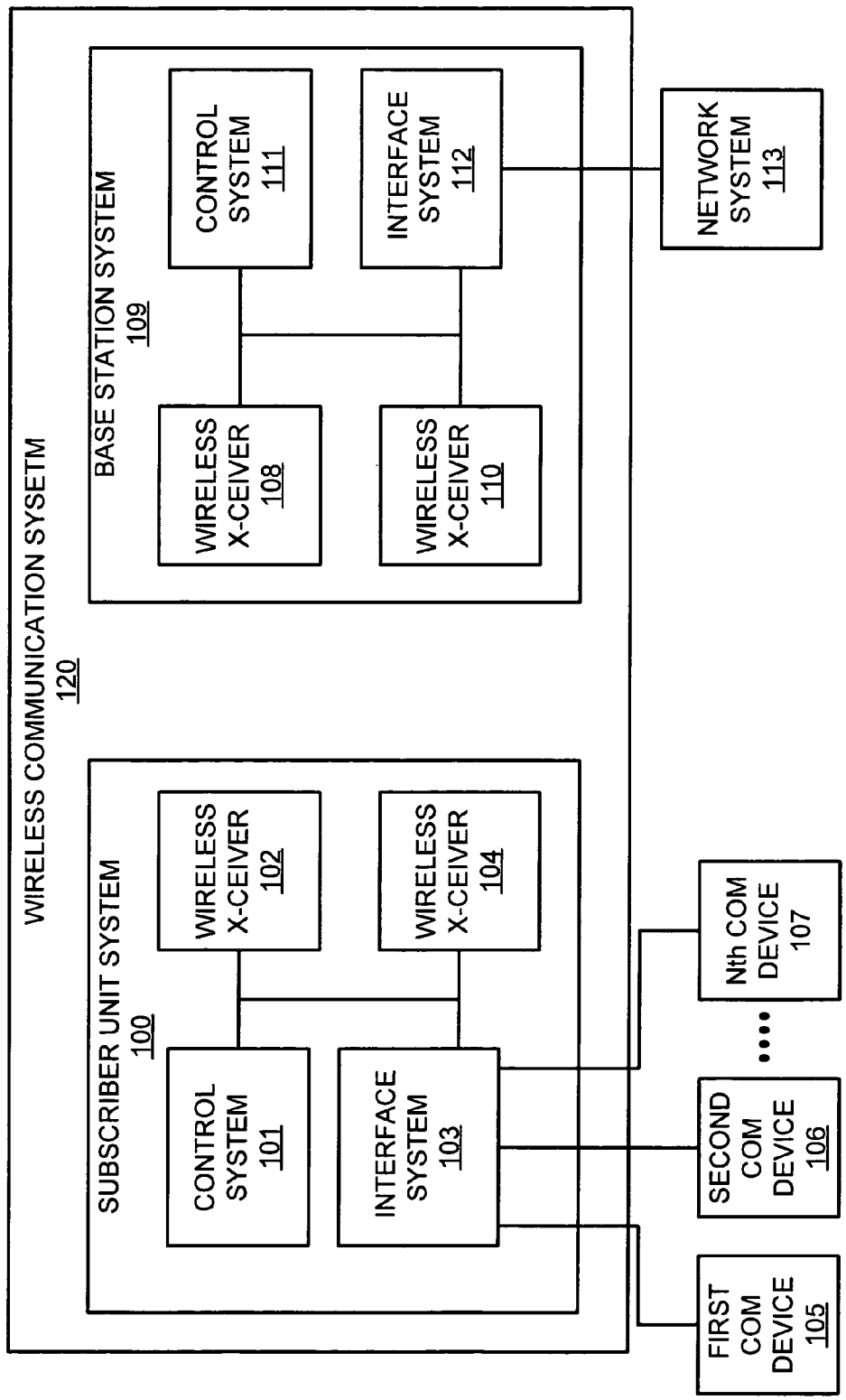
FIG. 1 illustrates an example of a wireless system according to the present invention.
Figure 2:
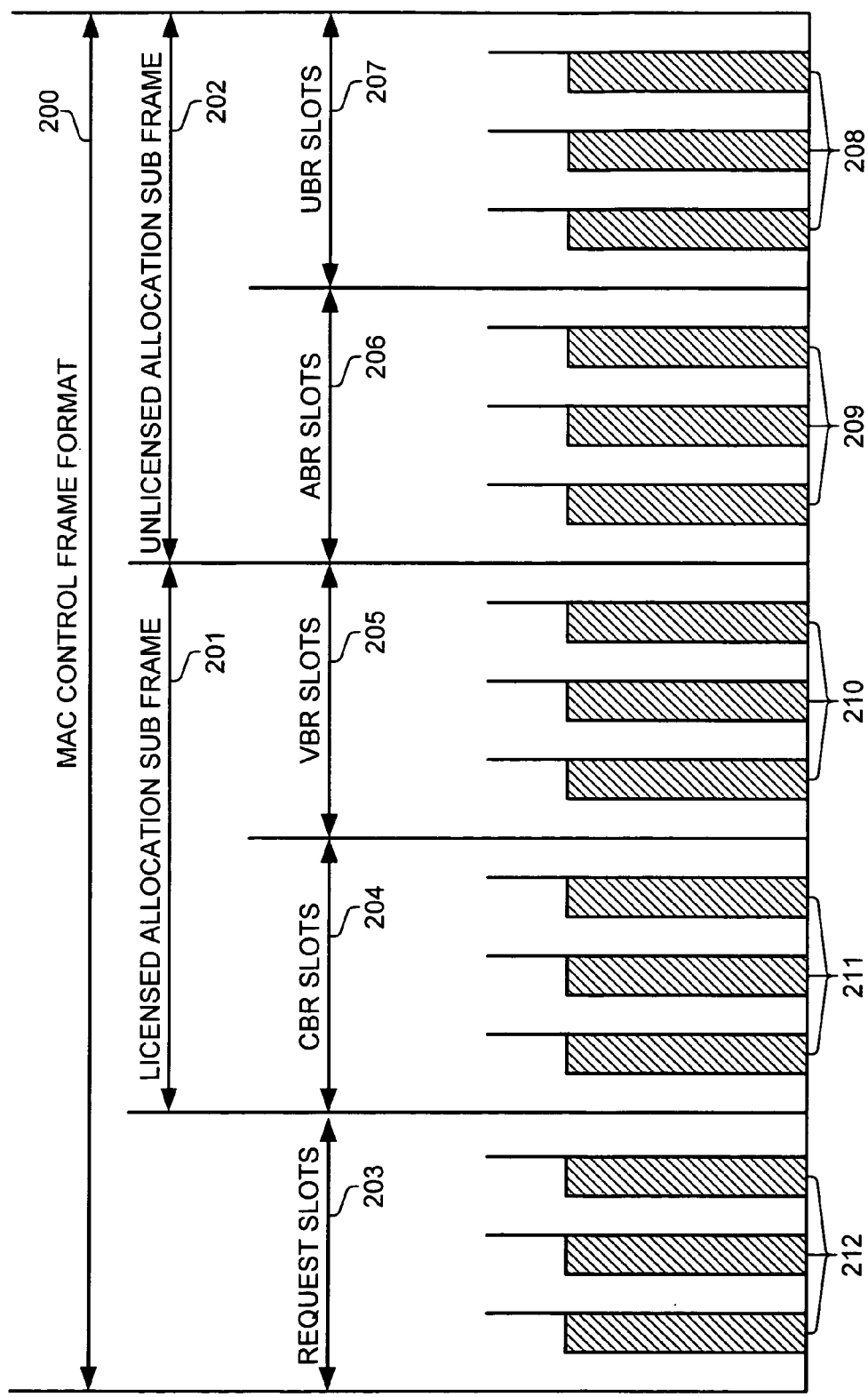
FIG. 2 illustrates an example of a MAC frame format in a MAC layer according to the present invention.
Figure 3:
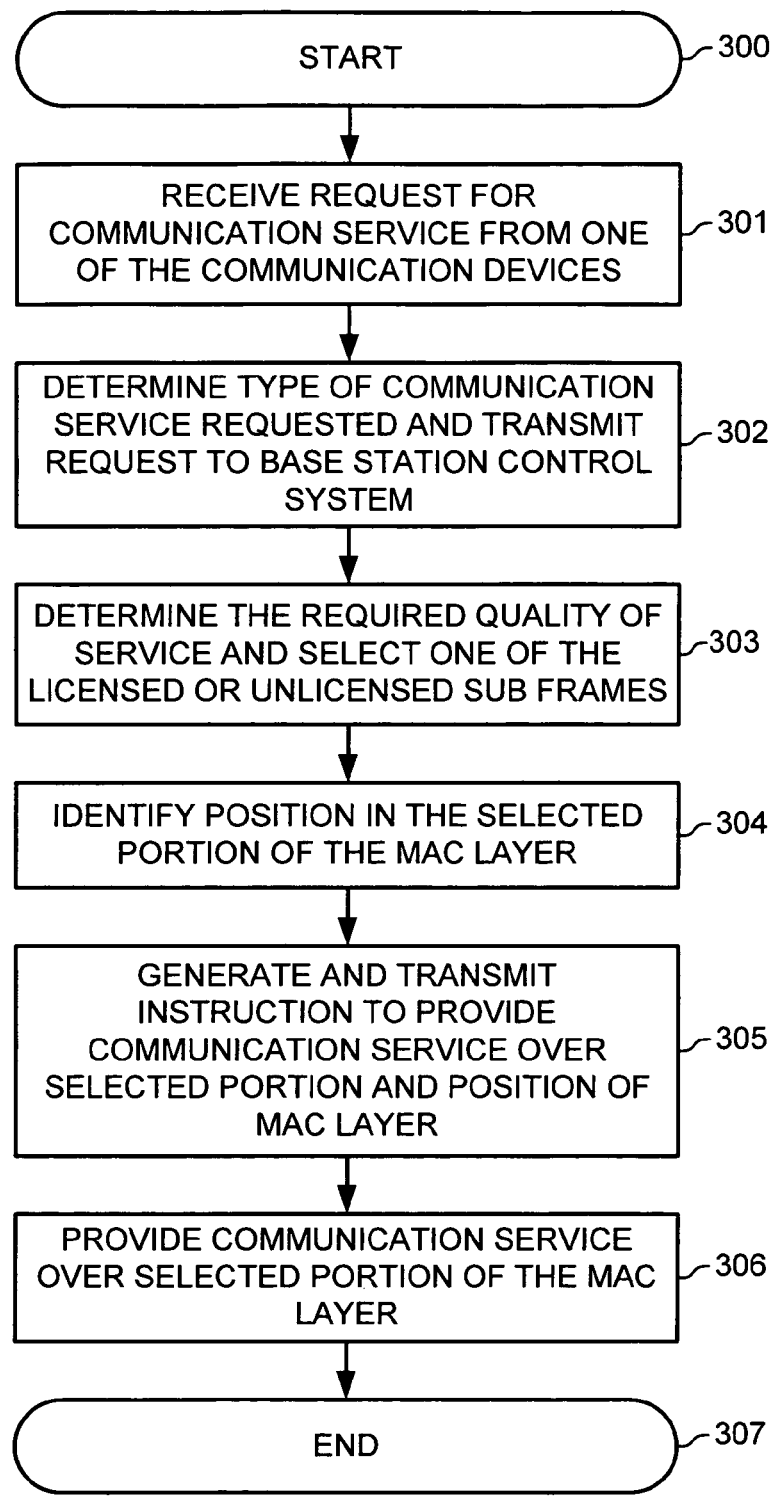
FIG. 3 is a flow chart illustrating an example of the operation of the wireless system of the present invention.

System Configuration and Operation—FIGS. 1-3

FIG. 1 depicts a wireless system 120 coupled to a first communication device 105, a second communication device 106, an Nth communication device 107 a network system 113. The wireless communication system 120 is comprised of a subscriber unit system 100 and a base station system 109. The subscriber unit system 100 is comprised of a subscriber control system 101, a communication interface system 103, and a pair of subscriber wireless transceivers 102 and 104. The communication interface system 103 is connected to the subscriber control system 101, the subscriber wireless transceivers 102 and 104, and the communication devices 105, 106, and 107. The subscriber control system 101 is connected to the subscriber wireless transceivers 102 and 104. The base station system 109 is comprised of a base station control system 111, a pair of base station wireless transceivers 108 and 110, and a network interface system 112. The network interface system 112 is connected to the base station control system 111, the base station wireless transceivers 108 and 110, and the network system 113. The base station control system 111 is connected to the base station wireless transceivers 108 and 110. Those skilled in the art will appreciate that subscriber unit system 100 and base station system 109 would typically include various conventional components not shown on FIG. 1 for clarity.

The communication interface system 103 could be any device that receives requests for communication service from the communication devices 105, 106, and 107, transmits requests for communication service to the subscriber control system 101, receives control information from the subscriber control system 101, and exchanges communication service between the communication devices 105, 106, and 107 and wireless transceivers 102 and 104. The communication interface system 103 could be a voice interface that acts as a POTS interface, supervises signals, channels voice lines, or resolves contention between voice lines. The communication interface system 103 could also be a data interface that manages data stream, performs asynchronous time division, or concentrates data lines.

The communication service could mean any service provided to a subscriber where the subscriber unit system 100 exchanges information with another device or person. Some examples of communication services include without limitation, voice communications, FAX communications, audio broadcasts, pay-per-view video broadcasts, web browsing, transferring data files, and e-mail. The communication devices 105, 106 and 107 could be any devices that transfer or receive information such as voice, data or video. Some examples of communication devices are wireline telephones, cellular telephones, fax machines, answering machines, private branch exchanges, computers, personal LANs, stereos, and televisions.

The subscriber wireless transceiver 102 could be any conventional transceiver that exchanges communication service requests between the communication interface system 103 and the base station wireless transceiver 108, receives control information from the subscriber control system 101, and exchanges communication service between the communication interface system 103 and the base station wireless transceiver 108. The subscriber wireless transceiver 104 could be any conventional transceiver that exchanges communication service requests between the communication interface system 103 and the base station wireless transceiver 110, receives control information from the subscriber control system 101, and exchanges communication service between the communication interface system 103 and the base station wireless transceiver 110.

The base station wireless transceiver 108 could be any conventional transceiver that exchanges communication service request between the subscriber wireless transceiver 102 and the network interface system 112, receives control information from the base station control system 111, and exchanges communication service between the subscriber wireless transceiver 102 and the network interface system 112. The base wireless transceiver 110 could be any conventional transceiver that exchanges communication service requests between the subscriber wireless transceiver 104 and the network interface system 112, receives control information from the base station control system 111, and exchanges communication service between the subscriber wireless transceiver 104 and the network interface system 112.

The subscriber wireless transceiver 102 and the base station wireless transceiver 108 comprise a first wireless transmission link between the subscriber unit system 100 and the base station system 109 and employ licensed frequencies for wireless transmissions. Some examples of the first wireless transmission link include without limitation, a multipoint multichannel distribution link, a personal communication service link, and a millimeter wave link using code division multiple access or time division multiple access technology. The subscriber wireless transceiver 104 and the base station wireless transceiver 110 comprise a second wireless transmission link between the subscriber unit system 100 and the base station system 109 employing unlicensed frequencies for wireless transmissions. Some examples of the second wireless transmission link include without limitation, a national information infrastructure link, an unlicensed personal communication service link, and an industrial scientific medical link using code division multiple access or time division multiple access technology. The term "wireless transceiver" could mean any device or plurality of devices that exchange transmissions over an air interface.

The network interface system 112 could be any device or plurality of devices that exchanges communication service requests between the wireless transceivers 108 and 110 and the base station control system 111 and exchanges communication service between the wireless transceivers 108 and 110 and the network system 113. The network interface system 112 could perform POTS line concentration or manage asynchronous time division or packet data stream.

The network system 113 could be any system or plurality of systems that bill, authorize, or exchange communication service with the network interface system 112. Some examples of the network system 113 include without limitation, public internet servers, private corporate intranet servers, video programming systems, multimedia network servers, and POTS servers.

The base station control system 111 could be any computer processing platform that: 1) receives a request for a communication service, 2) dynamically selects between a first portion of a MAC layer corresponding to the first wireless transmission link and a second portion of the MAC layer corresponding to the second wireless transmission link based on a quality of service, 3) and exchanges communications for the communication service over the selected one of the first wireless transmission link and the second wireless transmission link. In some examples of the present invention, the base station control system 111 could also coordinate the operation of the network interface system 112 and the base station wireless transceivers 108 and 110 to exchange the communications for the communication service with the network system 113 over the selected one of the first wireless transmission link and the second wireless transmission link. Those skilled in the art will appreciate that the base station control system 111 could be distributed within the network interface system 112, and the base station wireless transceivers 108 and 110.

The subscriber control system 101 could be any computer processing platform that: 1) transmits the request for the communication service to the base station control system 111 and exchanges communications for the communication service over the selected one of the first wireless transmission link and the second wireless transmission link. In some examples of the present invention, the subscriber control system 101 could also coordinate the operation of the communication interface system 103 and the subscriber wireless transceivers 102 and 104 to exchange the communications for the communication service with the communication devices 105, 106, and 107 over the selected one of the first wireless transmission link and the second wireless transmission link. Those skilled in the art will appreciate that the subscriber control system 101 could be distributed within the communication interface system 103, and the subscriber wireless transceivers 102 and 104.

In some examples of the present invention, such as where the request for the communication service is from network system 113, the operation of the subscriber control system 101 and the base station control system 111 could be reversed. In this case the base station control system 111 could provide the request to the subscriber control system 101 and exchange the communications over the selected one of the first and second wireless transmission link. Similarly, the subscriber control system 101 could receive the request for the communication service and select between the first and second portion of the MAC layer.

FIG. 2 depicts a media access control (MAC) frame format in a MAC layer in an example of the present invention. The MAC control frame format (MAC frame) 200 is comprised of a licensed allocation sub frame 201, corresponding to the licensed wireless transmission link, and the unlicensed allocation sub frame 202, corresponding to an unlicensed wireless transmission link. The MAC frame 200 also includes request slots 203. It should be noted that in some examples of the invention, the request slots 203 could be part of the licensed allocation sub frame 201, part of the unlicensed allocation sub frame 202, or included in both the licensed allocation sub frame 201 and the unlicensed allocation sub frame 202. Reservation information 212 is placed in the request slots 203. Reservation information 212 is control information for the communication service. Some examples of reservation information are user profile of authorized services, capacity parameters based on service priorities, service prioritization table, and system user ID correlation to service addresses (ex. IP address and phone numbers).

The licensed allocation sub frame 201 includes constant bit rate (CBR) slots 204 and variable bit rate (VBR) slots 205. The unlicensed allocation sub frame 202 includes available bit rate (ABR) slots 206 and undefined bit rate (UBR) slots 207. Communication information for requested communication services is placed in slots 204, 205, 206, and 207, depending on the type of communication requested and the portion of the MAC frame 200 selected e.g. the licensed allocation sub frame 201 or the unlicensed allocation sub frame 202. In one example of the invention information such as voice information 211 could be placed in CBR slots 204, while internet file transfer information 210 could be placed in VBR slots 205. In another example of the invention, information such as internet data services could be placed in ABR slots 206, while email information 208 could be placed in UBR slots 207. Those skilled in the art will understand the various queuing methods could be used to reserve information in the slots 204, 205, 206, and 207. Some examples of queuing methods include but may not be limited to circuit mode reservation, first-come-first-serve queuing, fair queuing, burst servicing policies, time of expiry queuing, and a statistical multiplexing algorithm where available capacity is allocated among demands based on usage parameters declared during call set-up.

FIG. 3 is a flow chart illustrating one example for providing communication services over a wireless communication system according to the present invention. The flow chart begins at step 300. At step 301, the subscriber control system 101 receives a request for a communication service with network system 113 from one of the communication devices 105, 106, and 107. The request is received in subscriber control system 101 via the communication interface system 103. In response to the request, the subscriber control system 101 determines the type of communication service requested, and transmits a request for that type of communication service to the base station control system 111 via a wireless signaling link at step 302. Those skilled in the art will appreciate that the communication service request could originate from the network system 113 and could be transmitted to the subscriber control system 101 via the wireless signaling link. For example, the network system 113 may have an incoming call for one of the communication devices 105, 106, and 107. In this case the base station control system 111 would determine the type of communication service requested and transmit the request for the communication service to the subscriber control system 101. It should also be noted that the wireless signaling link could be a part of the requests slots 203, the CBR slots 204, the VBR slots 205, the ABR slots 206 or the UBR slots 207, and can operate on either the licensed or unlicensed frequency.

In response to receiving the request, the base station control system 111 determines a required quality of service for the requested communication service at step 303. The required quality of service could be based on the delivery requirements for the requested communication service. Some examples of the delivery requirements are time dependency, need for real time communication, traffic patterns, bandwidth, priority, and grade of service. Also at step 303, the base station control system 111 selects one of the licensed allocation sub frame 201 or the unlicensed allocation sub frame 202 based on the determined required quality of service for the requested communication service. Based on the type of communication service requested, the base station control system 111 identifies a position in the section of the MAC layer for the requested communication service at step 304. At step 305, the base station control system 111 generates an instruction to provide the communication service using the selected portion and position in MAC layer and transmits the instruction for subscriber control system 101. At step 306, the communication service is provided between the network system 113 and the requesting communication device 105, 106, and 107 over the selected portion of the MAC layer. The communication service is provided through the network interface system 112, the communication interface system 103, and the pair of wireless transceivers corresponding to the selected portion of the MAC layer e.g. 102 and 108. Once the communication service concludes, the session terminates and wireless capacity tears down in reverse order ending the session at step 307.

Alternatively, the subscriber control system 101 could provide the request for the communication service from one of the call devices 105, 106, and 107 directly to the base station control system 111 and the base station control system 111 could determine the type of communication and select the portion of the MAC layer. Similarly, the base station control system 111 could provide the request for the communication service from the network system 113 directly to the subscriber control system 101 and the subscriber control system 101 could determine the type of communication and select the portion of the MAC layer.

Figure 4:
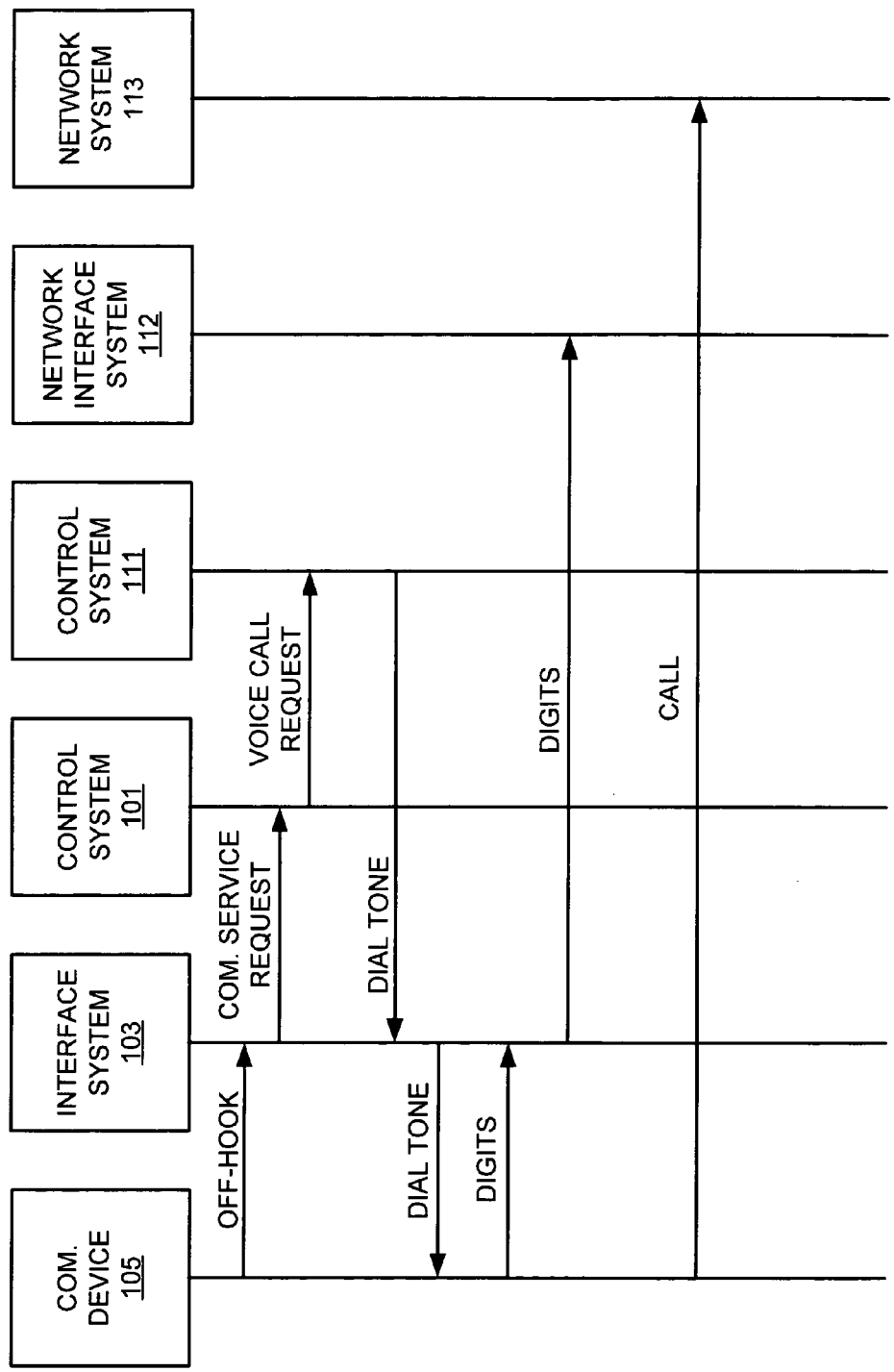
FIG. 4 is a flow chart illustrating another example of the operation of the wireless system of the present invention.
Figure 5:
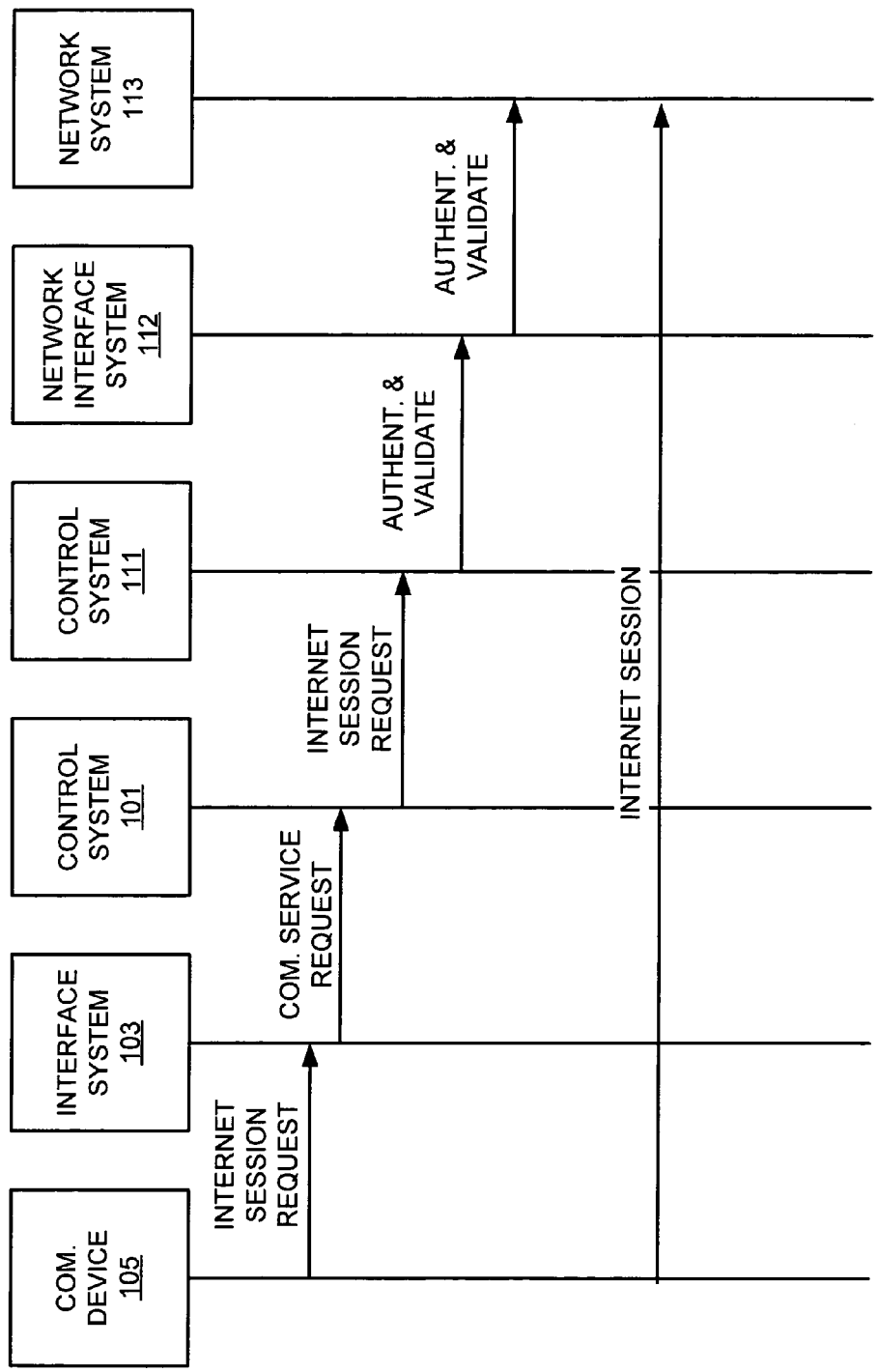
FIG. 5 is a flow chart illustrating another example of the operation of the wireless system of the present invention.

Examples of System Operation—FIGS. 4 and 5:

FIGS. 4 and 5 illustrate additional examples of system operation in accordance with the present invention. It is anticipated however, that one skilled in the art will recognize numerous other examples in accordance with the principles described below, and thus, the following examples are for the purpose of illustration and not limitation. Those skilled in the art will also appreciate that various features described below could be combined with the above described embodiment to form multiple variations of the invention.

In this example the communication devices 105, 106 and 107 could be connected to the subscriber unit system 100 by communication links employing digital subscriber line (DSL) and/or cable modem technology. Similarly, the subscriber unit system 100 and the base station system 109 could utilize fixed wireless access technology to provide voice and data communications and the first communication device 105 could be a conventional telephone.

FIG. 4 depicts a message sequence chart illustrating an example of a voice call using a wireless system according to the present invention. On FIG. 4 the subscriber picks up the communication device 105 triggering an off-hook event in the communication interface system 103. Recognizing the communication service request as a request for a voice call, the communication interface system 103 transmits a communication service request message that includes a voice call trigger to the subscriber control system 101. The communication interface system 103 could recognize that a voice call is being requested using various methods including but not limited to, a dedicated port or board for the communication device 105, a separate signaling channel, or a packet transmission from communication device 105.

The subscriber control system 101 processes the communication service request to generate and transmit a request for a voice call to the base station control system 111 through an upstream signaling connection. The upstream signaling connection could utilize either wireless transceivers 102 and 108 corresponding to the licensed transmission link or could use wireless transceivers 104 and 110 corresponding to the unlicensed transmission link. Responsive to receiving the voice call request, the base station control system 111 determines the required quality of service for the requested communication using allocation rules based on control objectives. Some examples of the control objectives include without limitation, (1) continually exchanging traffic between the requesting communication device e.g. 105 and the network system 113 using the portion of the MAC layer corresponding to the licensed wireless transmission link where the required quality of service is high, and (2) continually exchanging traffic between the requesting communication device e.g. 105 and the network system 113 using the portion of the MAC layer corresponding to the unlicensed wireless transmission link where the required quality of service is low. In the case of a voice call where the required quality of service is high, the base station control system 111 selects the portion of the MAC layer corresponding to the licensed transmission link.

In response to selecting the portion of the MAC layer, the base station control system 111 identifies a position in the selected portion for an upstream voice communication and a downstream voice communication. For example, the base station control system 111 could select CBR slots 204 for the voice call. The base station control system 111 then transmits an instruction to the subscriber control system 101 to provide the requested voice communication based on the selected portion and position in the MAC layer.

The subscriber control system 101 and the base station control system 111 coordinate the provision of the voice communication service and set up a virtual connection path for the call based on the selected portion and position in the MAC layer for the upstream and downstream voice communication. The virtual connection path is comprised of a downstream virtual connection and an upstream virtual connection between the communication interface system 103 and the network interface system 112.

After the virtual connection path is set up the base station control system 111 responds with a dial tone for the communication interface system 103. The communication interface system 103 provides the dial tone to the call device 105. The subscriber then dials a telephone number. The communication interface system 103 provides the digits through the upstream signaling connection to the network interface system 112 to complete the call. The virtual path connection and wireless capacity is torn down in reverse order after call is completed.

FIG. 5 depicts a message sequence chart illustrating an example of an internet data session using a wireless system according to the present invention. In this example, the base station system 109 could be connected to network system 113 by a metropolitan fiber ring or terrestrial microwave system using SONET and/or ATM protocols. The base station system 109 and subscriber unit system 100 could also use packet transmission network architecture to provide always-connected communication services, even for connectionless services. Second communication device 106 could be a conventional computer. On FIG. 5 the subscriber requests the internet data session using the communication device 106. Recognizing the communication service request as a request for an internet data session, the communication interface system 103 transmits a communication service request message that includes an internet data session trigger to the subscriber control system 101. The communication interface system 103 could recognize the request as an internet data session using various methods including but not limited to, a dedicated port or board for the communication device 106, a separate signaling channel, or a packet transmission from communication device 106.

The subscriber control system 101 processes the communication request to generate and transmit a request for the internet data session to the base station control system 111 through an upstream signaling connection. The upstream signaling connection could utilize either wireless transceivers 102 and 108 corresponding to the licensed transmission link or could use wireless transceivers 104 and 110 corresponding to the unlicensed transmission link. Responsive to receiving the internet data session request, the base station control system 111 performs authentication and authorization of the subscribers Internet account using network interface system 112. For example, the network interface system 112 checks if the subscriber has a valid Internet account for web browsing or e-mail. If the subscribers account is not authorized or authenticated, the session ends. If the account is authorized and authenticated, the internet session connection continues and the base station control system 111 determines the required quality of service using the allocation rules based on the control objectives. In the case of an internet data session that does not require a high quality of service, the base station control system 111 selects the portion of the MAC layer corresponding to the unlicensed transmission link.

In response to selecting the portion of the MAC layer, the base station control system 111 identifies a position in the selected portion for an upstream internet communication and a downstream internet communication. For example, the base station control system 111 could select UBR slots 207 for the internet data session. The base station control system 111 then transmits an instruction to the subscriber control system 101 to provide the requested internet data session based on the selected portion and position in the MAC layer to establish the internet data session. After the subscriber terminates the internet session, the wireless capacity tears down in reverse order.

Those skilled in the art will understand that the internet data session could include e-mail, world wide web browsing, PUSH technology, and chat rooms. Those skilled in the art will understand that the examples in FIGS. 4 and 5 could apply to other communication devices such as televisions, set top boxes, and stereos. Some examples of communication services provided to other communication devices are audio broadcast, file transfers, data transfers, network games, desktop multimedia communications, video broadcasting, and video conferencing. Those skilled in the art will appreciate that the instruction to provide the communication service that require only one way communication such as a video broadcast will only be sent to elements providing the communication service.

The above-described control systems could be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are integrated circuits and logic circuitry. Those skilled in the art are familiar with instructions, processors, and storage media.

Those skilled in the art will appreciate variations of the above described embodiments that fall within the scope of the invention. As a result, the invention is not limited to the specific examples and illustrations discussed above, but only by the following claims and their equivalents.

I claim:

1. A method for operating a wireless subscriber unit, the method comprising:
   in an interface system, receiving a user request for a communication service from a communication device;
   in a control system, in response to receiving the user request, determining a required quality of service for the requested communication service;
   in the control system, upon determining the required quality of service, dynamically selecting a one from a licensed wireless transmission link and an unlicensed wireless transmission link based on the required quality of service for the requested communication service; and
   in a wireless transceiver, providing the requested communication service over the selected one of the licensed wireless transmission link and the unlicensed wireless transmission link.

2. The method of claim 1 wherein determining the required quality of service for the requested communication service comprises determining the required quality of service based on a delivery requirement of the requested communication service, and wherein the licensed wireless transmission link is selected based on determining that the required quality of service is a high quality of service.

3. The method of claim 2 wherein the unlicensed wireless transmission link is selected based on determining that the required quality of service is a low quality of service, and wherein the communication service is one of a plurality of communication services provided to the communication device, and wherein each of the plurality of communication services corresponds to a different one of a plurality of qualities of service, and wherein determining the required quality of service for the requested communication service comprises determining the required quality of service based on the quality of service of the plurality of qualities of service that corresponds to the requested communication service.

4. The method of claim 1 wherein the licensed wireless transmission link is a multipoint multichannel distribution service link.

5. The method of claim 1 wherein the licensed wireless transmission link is a personal communication service (PCS) link.

6. The method of claim 1 wherein the licensed wireless transmission link is a code division multiple access (CDMA) link.

7. The method of claim 1 wherein the licensed wireless transmission link is a time division multiple access (TDMA) link.

8. The method of claim 1 wherein the requested communication service is an audio communication.

9. The method of claim 1 wherein the requested communication service comprises an Internet data session.

10. The method of claim 1 wherein the licensed wireless transmission link is between the wireless subscriber unit and a first base station and wherein the unlicensed wireless transmission link is between the wireless subscriber unit and a second base station.

11. A computer readable storage medium encoded with instructions comprising:
    communication software operational when executed by a processor to direct the processor to receive a user request for a communication service from a communication device, in response to receiving the user request, determine a required quality of service for the requested communication service, upon determining the required quality of service, dynamically select a one from a licensed wireless transmission link and an unlicensed wireless transmission link based on the required quality of service for the requested communication service, and provide the requested communication service over the selected one of the licensed wireless transmission link and the unlicensed wireless transmission link.

12. The computer readable storage medium of claim 11 wherein the required quality of service for the requested communication service is determined based on a delivery requirement of the requested communication service, and wherein the licensed wireless transmission link is selected based on determining that the required quality of service is a high quality of service.

13. The computer readable storage medium of claim 12 wherein the unlicensed wireless transmission link is selected based on determining that the required quality of service is a low quality of service, and wherein the communication service is one of a plurality of communication services provided to the communication device, and wherein each of the plurality of communication services corresponds to a different one of a plurality of qualities of service, and wherein the required quality of service for the requested communication service is determined based on the quality of service of the plurality of qualities of service that corresponds to the requested communication service.

14. The computer readable storage medium of claim 11 wherein the licensed wireless transmission link is a multipoint multichannel distribution service link.

15. The computer readable storage medium of claim 11 wherein the licensed wireless transmission link is a personal communication service (PCS) link.

16. The computer readable storage medium of claim 11 wherein the licensed wireless transmission link is a code division multiple access (CDMA) link.

17. The computer readable storage medium of claim 11 wherein the licensed wireless transmission link is a time division multiple access (TDMA) link.

18. The computer readable storage medium of claim 11 wherein the requested communication service is an audio communication.

19. The computer readable storage medium of claim 11 wherein the requested communication service comprises an Internet data session.

20. The computer readable storage medium of claim 11 wherein the licensed wireless transmission link is between the wireless subscriber unit and a first base station and wherein the unlicensed wireless transmission link is between the wireless subscriber unit and a second base station.

21. A wireless subscriber unit system comprising:
an interface configured to receive a user request for a communication service from a communication device; and
a processing system configured to, in response to the interface receiving the user request, determine a required quality of service for the requested communication service, upon determining the required quality of service, dynamically select a one from a licensed wireless transmission link and an unlicensed wireless transmission link based on the required quality of service for the requested communication service, and provide the requested communication service over the selected one of the licensed wireless transmission link and the unlicensed wireless transmission link.

22. The system of claim 21 wherein the required quality of service for the requested communication service is determined based on a delivery requirement of the requested communication service, and wherein the licensed wireless transmission link is selected based on determining that the required quality of service is a high quality of service.

23. The system of claim 22 wherein the unlicensed wireless transmission link is selected based on determining that the required quality of service is a low quality of service and wherein the communication service is one of a plurality of communication services provided to the communication device, and wherein each of the plurality of communication services corresponds to a different one of a plurality of qualities of service, and wherein the required quality of service for the requested communication service is determined based on the quality of service of the plurality of qualities of service that corresponds to the requested communication service.

24. The system of claim 21 wherein the licensed wireless transmission link is a multipoint multichannel distribution service link.

25. The system of claim 21 wherein the licensed wireless transmission link is a personal communication service (PCS) link.

26. The system of claim 21 wherein the licensed wireless transmission link is a code division multiple access (CDMA) link.

27. The system of claim 21 wherein the licensed wireless transmission link is a time division multiple access (TDMA) link.

28. The system of claim 21 wherein the requested communication service is an audio communication.

29. The system of claim 21 wherein the requested communication service comprises an Internet data session.

30. The system of claim 21 wherein the licensed wireless transmission link is between the wireless subscriber unit and a first base station and wherein the unlicensed wireless transmission link is between the wireless subscriber unit and a second base station.

\* \* \* \* \*